Patented Dec. 26, 1950

2,535,052

UNITED STATES PATENT OFFICE 2,535,052

INSECT REPELLENTS

Nathan L. Drake, College Heights, Md., and Charles M. Eaker, Affton, Mo., assignors to the United States of America as represented by the Secretary of the Army No Drawing. Application January 11, 1949, Serial No. 70,391

5 Claims. (Cl. 167—30)

This invention relates to insect repellents.

We have found that the application of the cyclopentyl ester of 2-oxo-cyclopentanecarboxylic acid to the human skin affords effective protection against insect bites, by repelling insects, particularly *Aedes aegypti* and *quadrimaculatus Anopheles*.

A number of tests to measure the repellency of the cyclopentyl ester of 2-oxo-cyclopentanecarboxylic acid against *Aedes aegypti* was conducted by smearing the compound on the arms of test personnel, who then thrust their arms into cages containing *Aedes aegypti*. The arms were exposed for 30-minute intervals at 3 minutes each until the first insect bite.

It was found that the application of the cyclopentyl ester of 2-oxo-cyclopentanecarboxylic acid affords protection against *Aedes aegypti* for an average of 250 minutes. Against *Anopheles quadrimaculatus*, an average repellency time of 56 minutes was noted in analogous tests.

The cyclopentyl ester of 2-oxo-cyclopentanecarboxylic acid may be synthesized as follows:

The di-ethyl ester of adipic acid is converted into the ethyl ester of 2-oxo-cyclopentanecarboxylic acid by heating in the presence of sodium; see Organic Syntheses, Collective Vol. 2, page 116 (1942). The ethyl ester is then trans-esterified by reacting it with cyclopentanol in an oil bath at a temperature of the order of 160° C. and sweeping out the ethyl alcohol, which forms as a by-product, by means of a current of nitrogen.

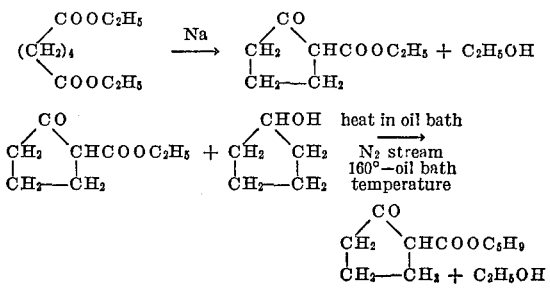

For ease of application to the skin, the cyclopentyl ester of 2-oxo-cyclopentanecarboxylic acid may be incorporated in a suitable inert liquid or solid carrier such as mineral oil, alcohol, petrolatum, etc.

Having thus described our invention, we claim:

1. An insect repellent composition comprising the cyclopentyl ester of 2-oxo-cyclopentanecarboxylic acid in a non-gaseous inert organic carrier.

2. An insect repellent composition comprising the cyclopentyl ester of 2-oxo-cyclopentanecarboxylic acid in mineral oil.

3. An insect repellent composition comprising the cyclopentyl ester of 2-oxo-cyclopentanecarboxylic acid in alcohol.

4. An insect repellent composition comprising the cyclopentyl ester of 2-oxo-cyclopentanecarboxylic acid in petrolatum.

5. The cyclopentyl ester of 2-oxo-cyclopentanecarboxylic acid.

NATHAN L. DRAKE.
CHARLES M. EAKER.

REFERENCES CITED

The following references are of record in the file of this patent:

OSRD Insect Control Committee Report No. 16, Interim Report No. 0-87, Feb. 1, 1945, pages 104 and 116, Orlando Nos. 0-6139 and 0-6133 particularly pertinent.